July 27, 1926.
P. MATHER
STILL AND METHOD OF DISTILLING
Filed August 9, 1921     10 Sheets-Sheet 1
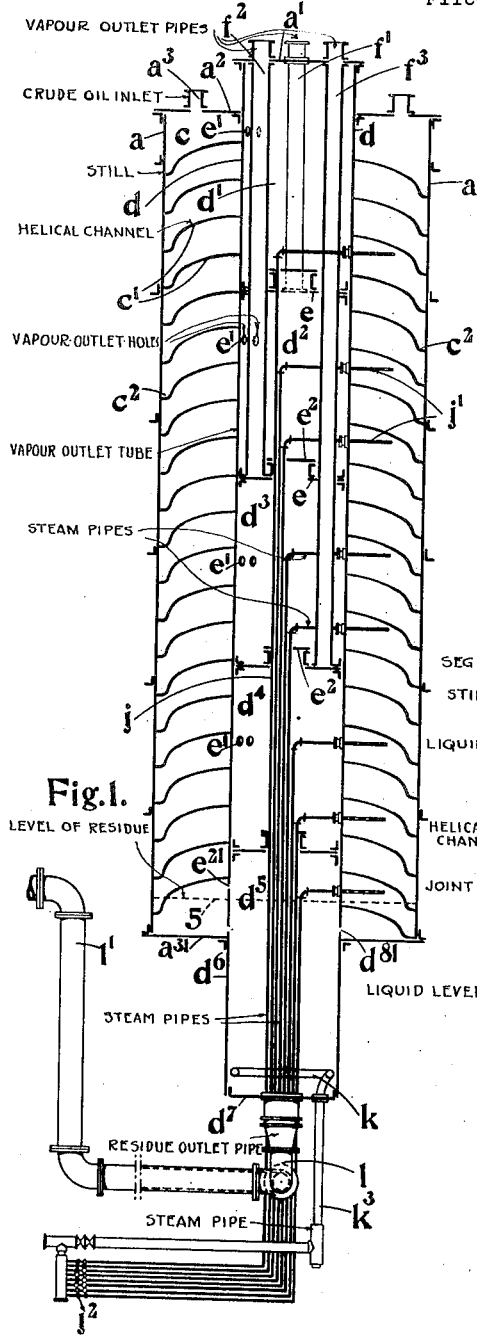
Fig.1.
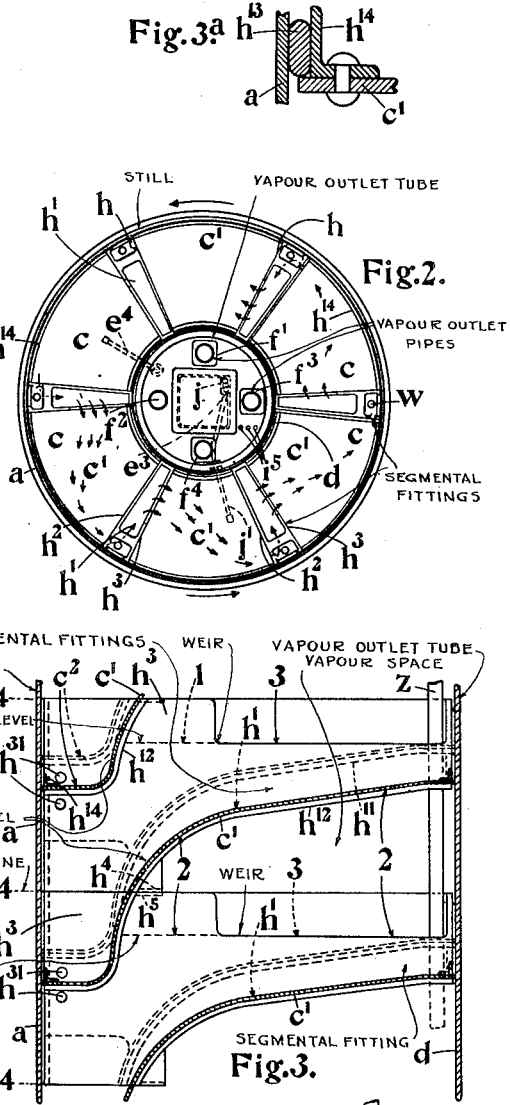
Fig.3ª
Fig.2.
Fig.3.
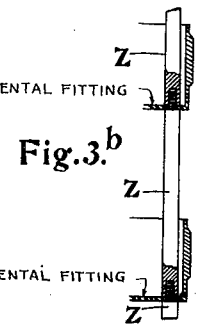
Fig.3.b
Inventor
P. Mather
by
W. E. Evans
Attorney.

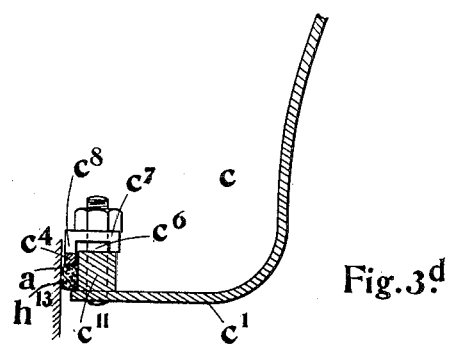
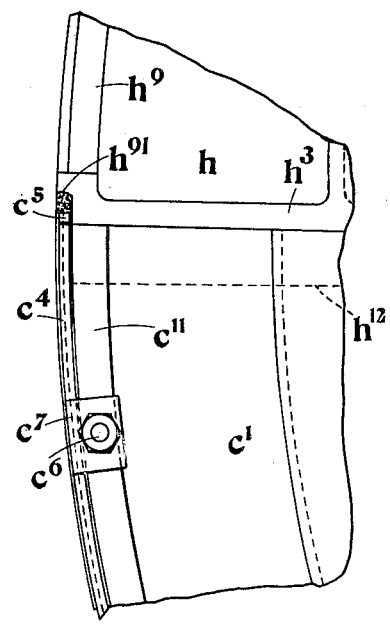

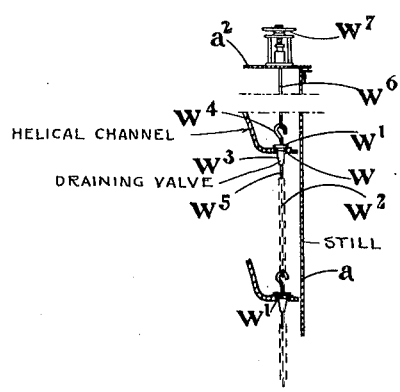
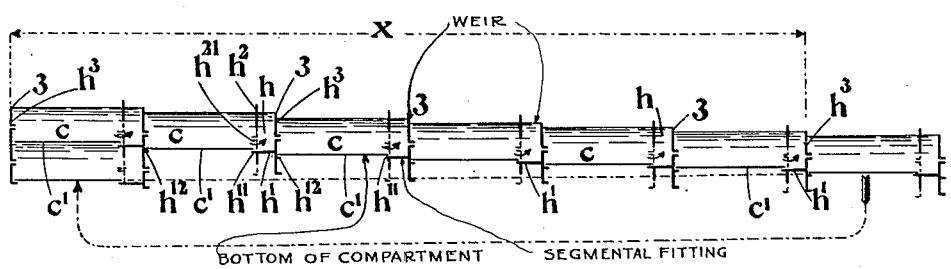

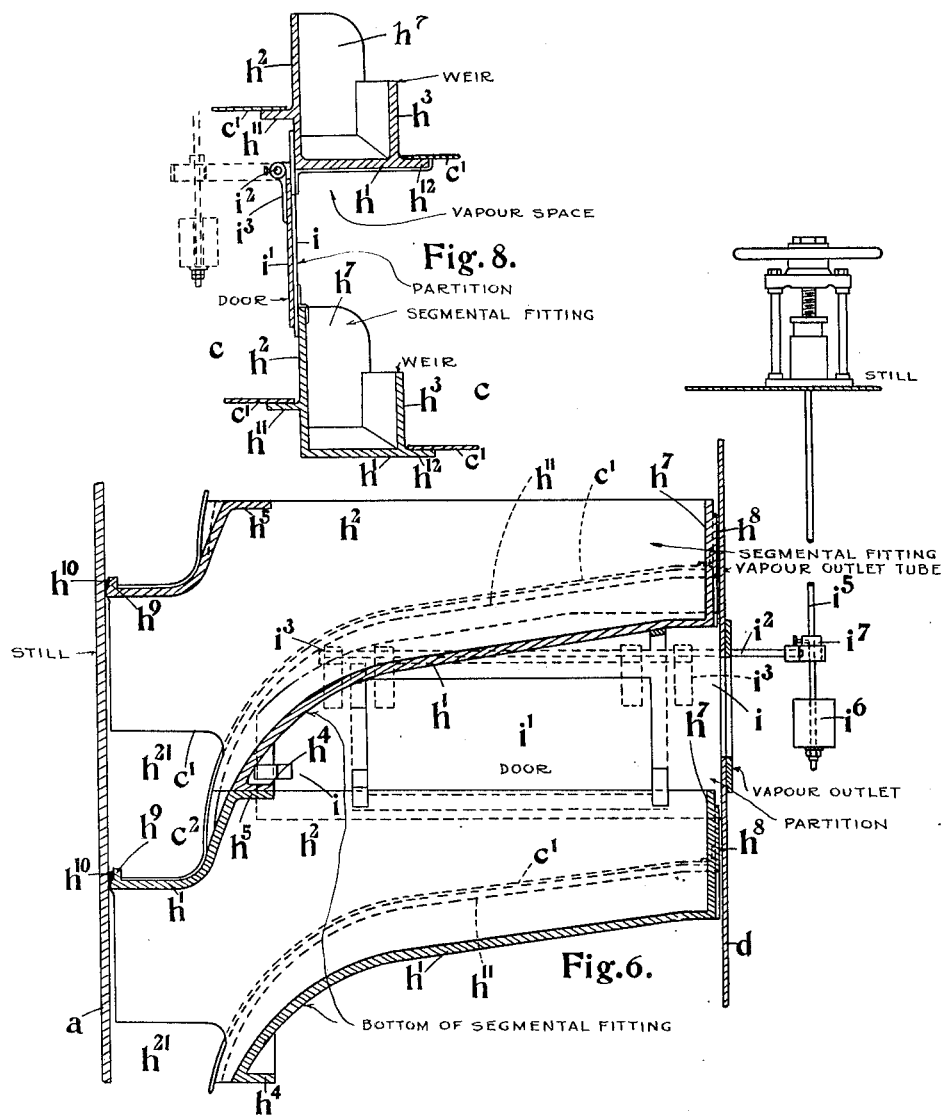
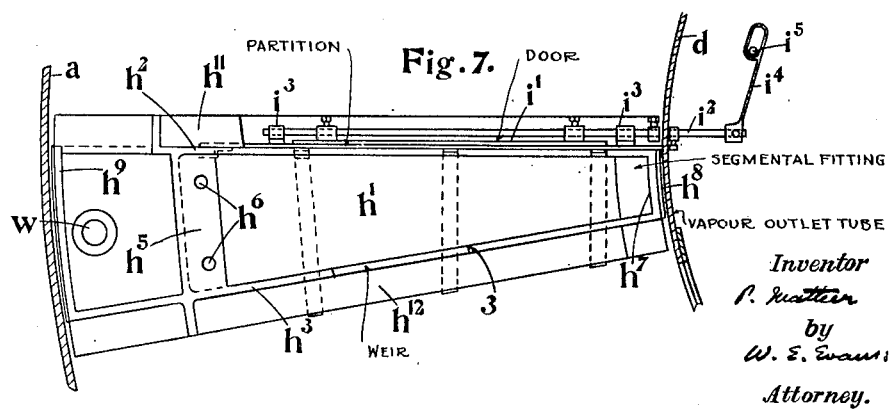

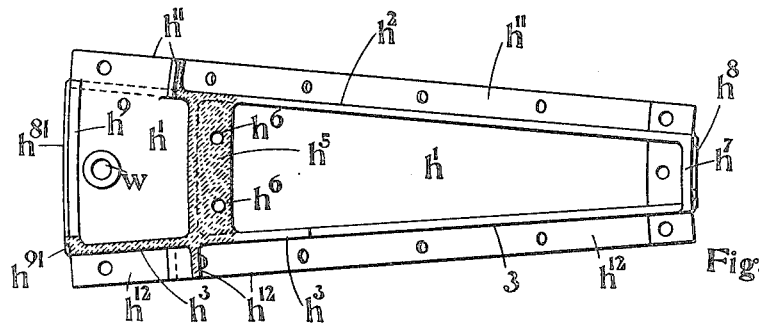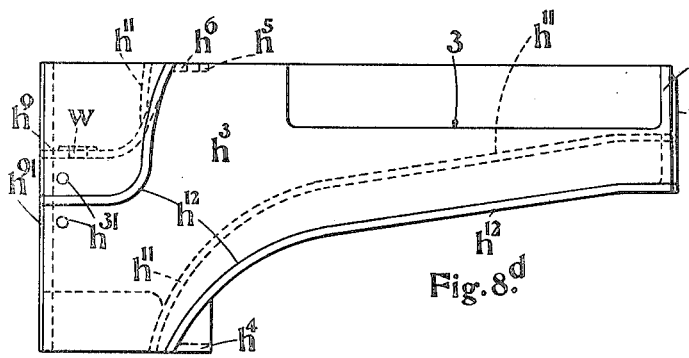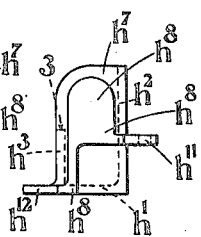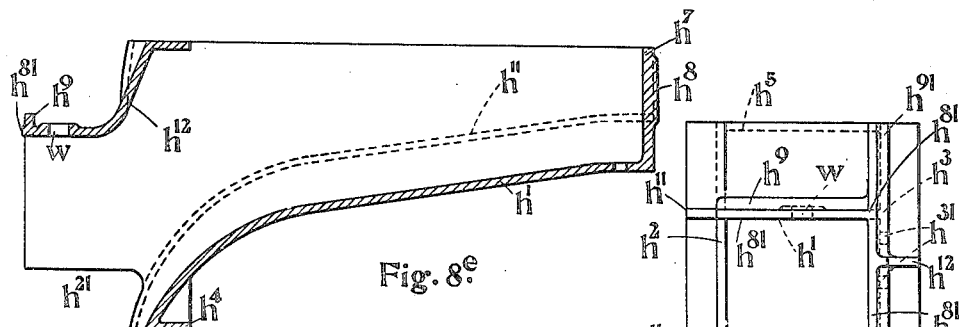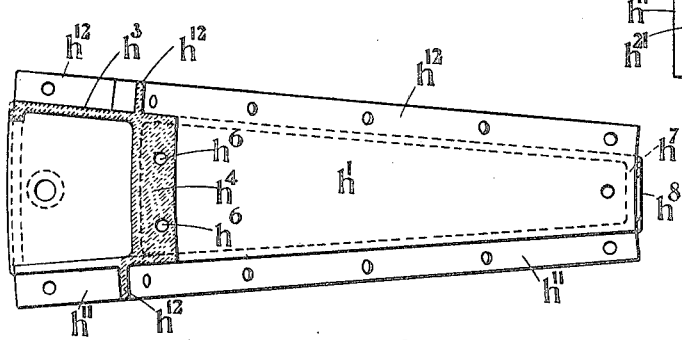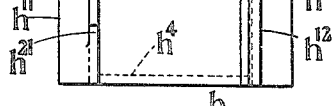

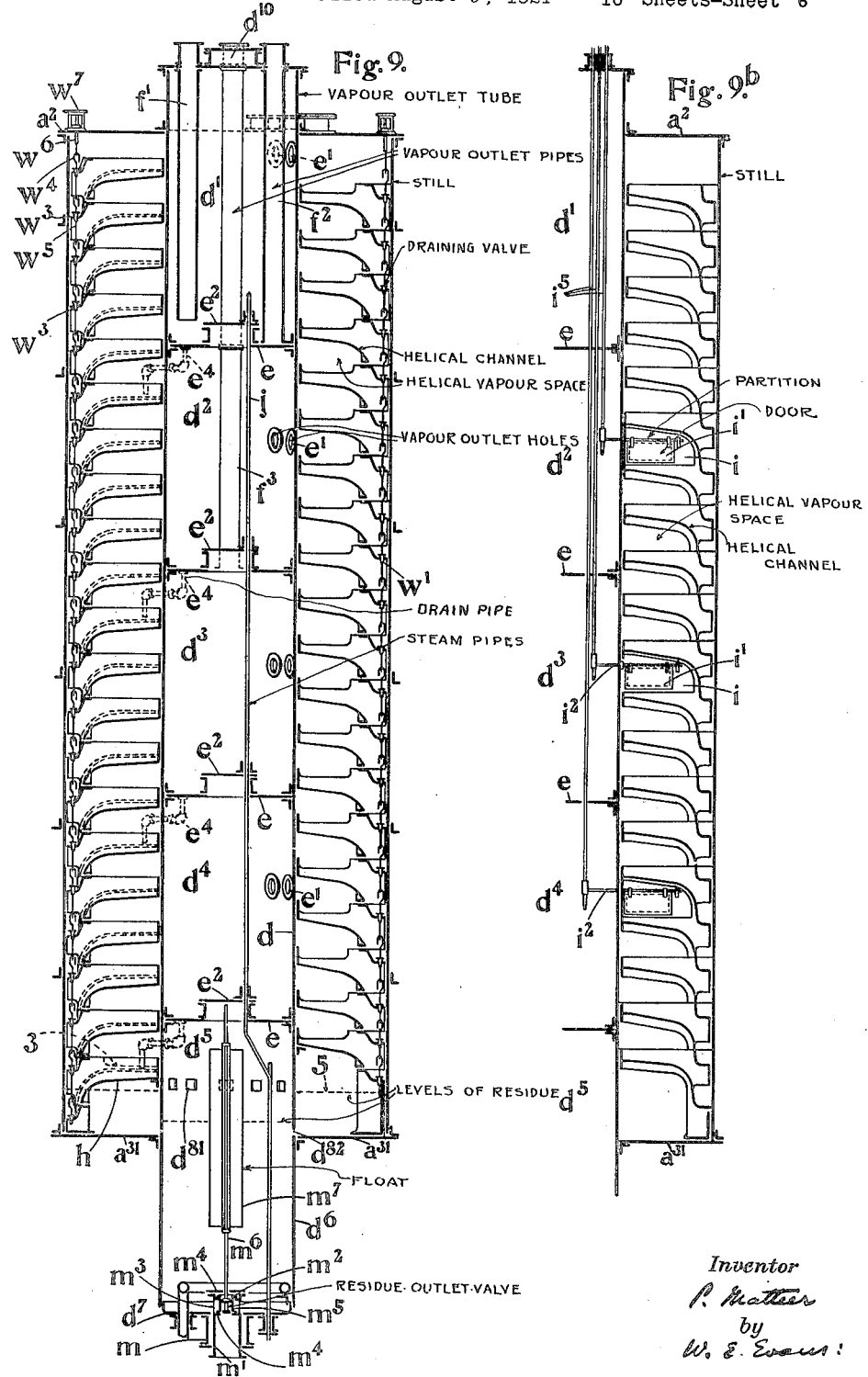

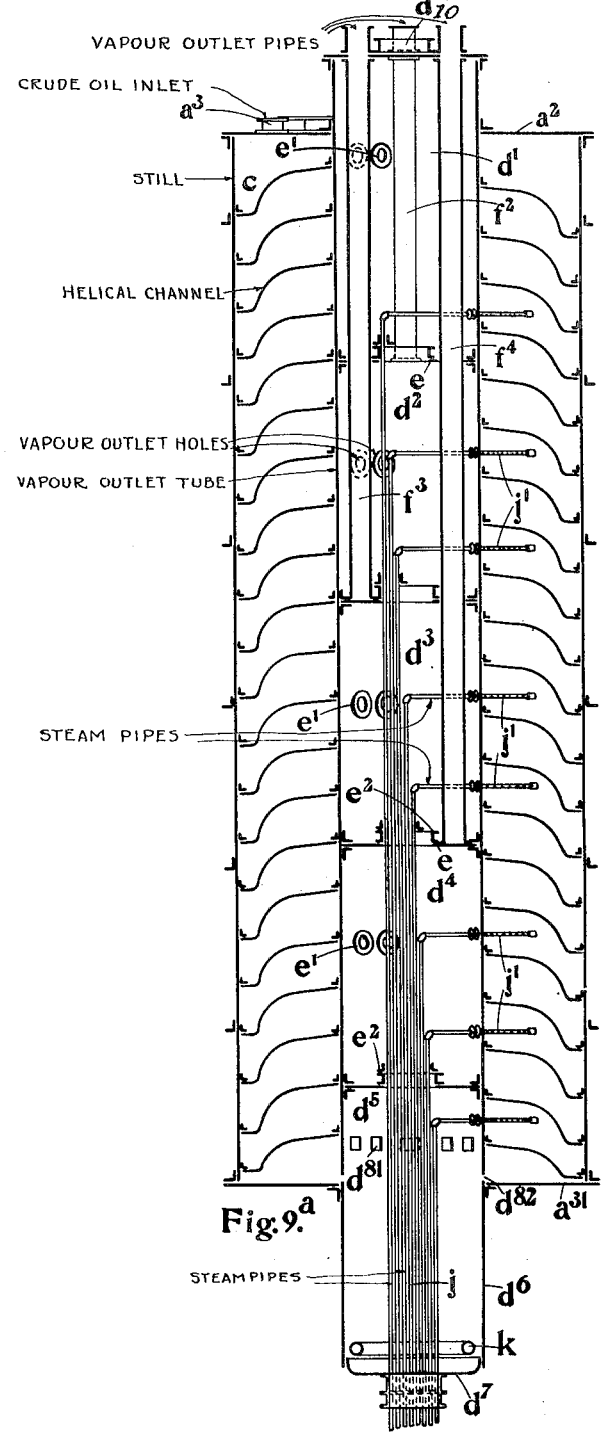

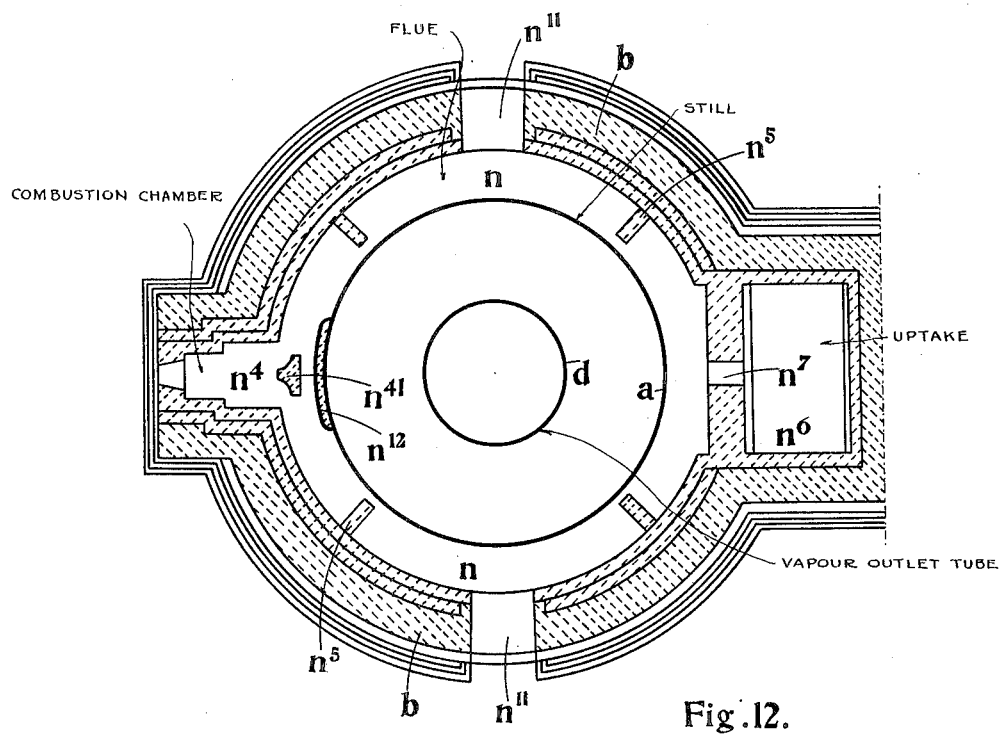
Fig. 12.
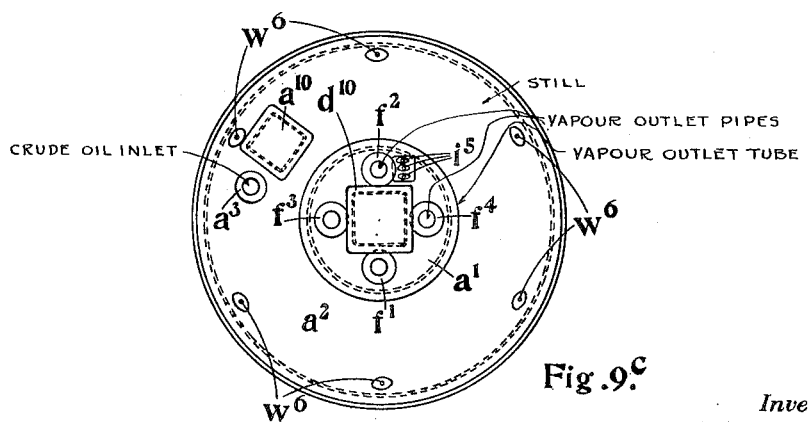
Fig. 9.ᶜ

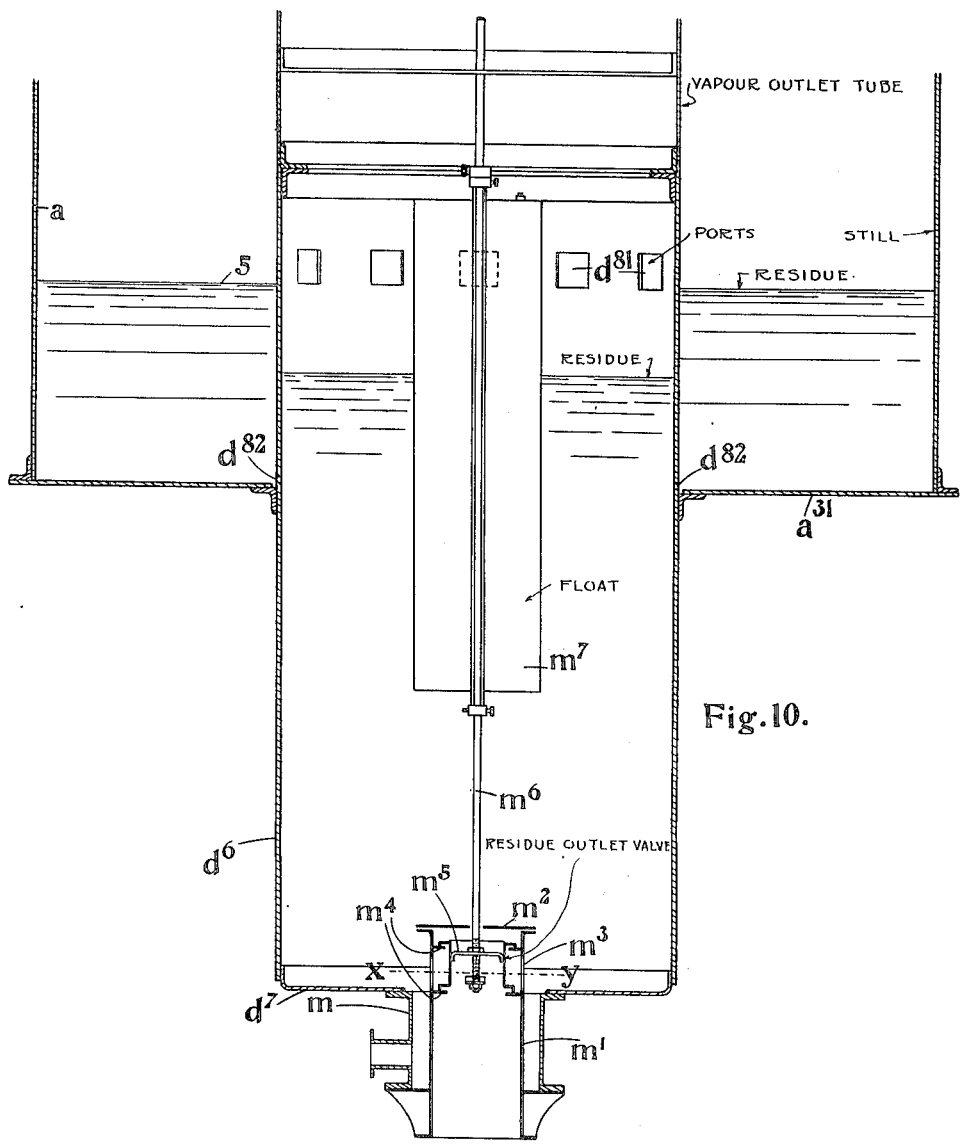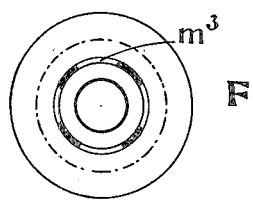

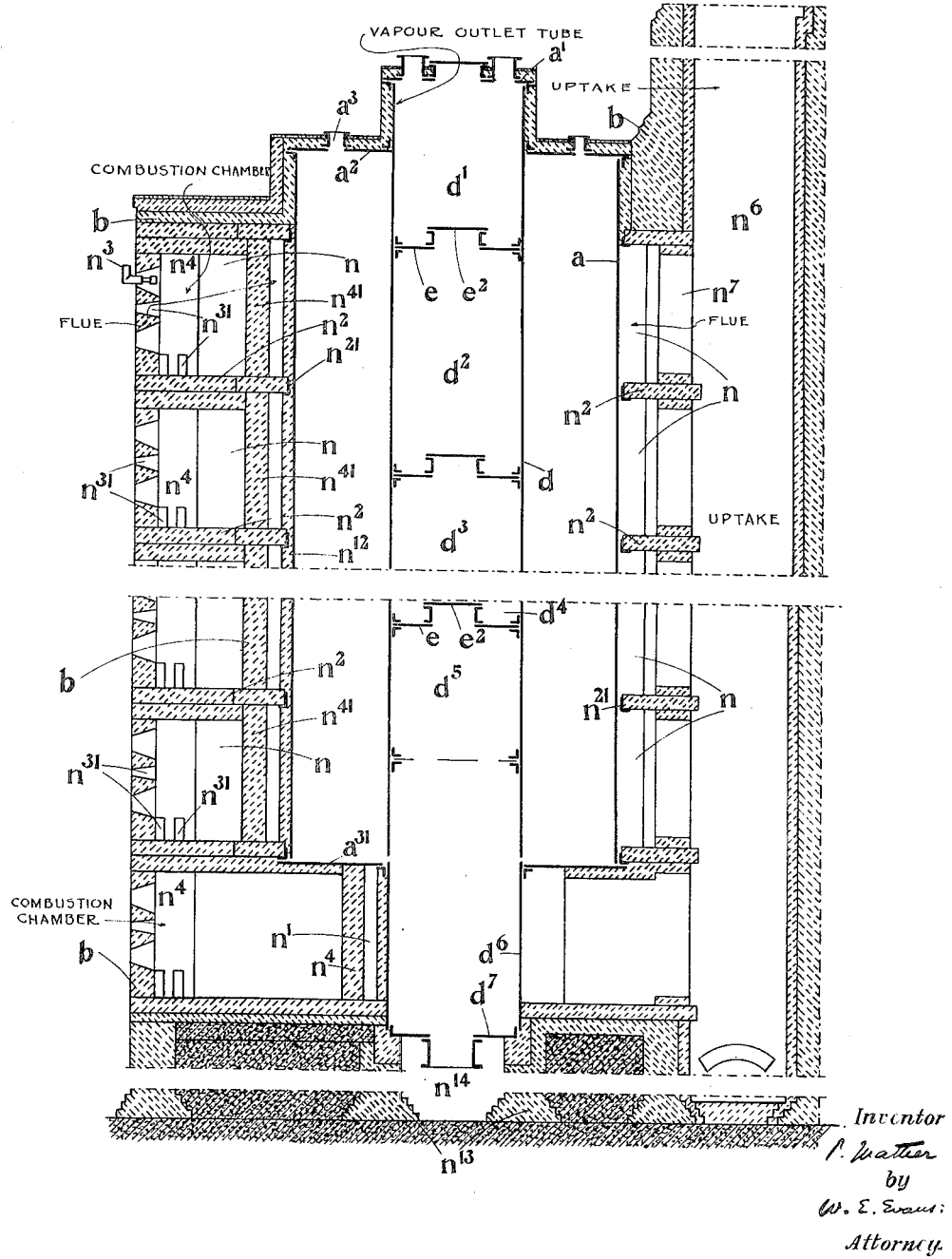

Patented July 27, 1926.

1,594,209

UNITED STATES PATENT OFFICE.

PERCY MATHER, OF LONDON, ENGLAND.

STILL AND METHOD OF DISTILLING.

Application filed August 9, 1921, Serial No. 490,949, and in Great Britain August 18, 1920.

This invention relates to stills for the distillation of crude oil and other similar liquids capable of fractional distillation.

The invention has among its objects to effect the continuous and expeditious distillation of the crude oil or other liquid, in bulk and while in movement in the still, under conditions favourable to the uniform transmission of heat to the liquid, and to the vapours being released immediately on their production; and to effect fractional distillation by the subjection of the liquid to be distilled in bulk to gradually increasing temperatures according to the fractions required, so as to ensure good fractionation, and efficiency and economy in the production of the various distillation products.

According to the invention the crude oil or liquid to be distilled is caused to flow through the still in an exposed and interrupted stream in a position adjacent to the still casing, while the still casing is subjected to heat externally applied.

The invention comprises means for intercepting the liquid in its course through the still, and for inducing the circulation of the liquid and the release of vapour at the surface thereof.

The invention also comprises means for imparting to the liquid a substantially helical course in its passage through the still and for disposing the channel, or the series of compartments constituting the channel, through which the liquid passes, within a space between the still casing and a centrally disposed vapour outlet tube.

The invention furthermore comprises means for the withdrawal of the vapours in a number of positions in the course of the liquid through the still.

The invention also comprises the features of method and construction which are hereinafter described.

The invention is illustrated by way of example in the accompanying drawings, in which—

Figure 1 represents diagrammatically in sectional elevation a still adapted for the distillation of crude oil or partially topped oil. In this figure the still is shown clear of the setting.

Figure 2 is a sectional plan corresponding to Figure 1 but on a slightly enlarged scale.

Figure 3 is a sectional elevation through one of the compartments of which the channel is constituted, showing the manner in which the bottom plates of the respective compartments are carried by segmental fittings, and the manner in which these segmental fittings are mounted one upon the other in position between the casing of the still and the centrally disposed vapour outlet tube.

Figure 3ª is a detail view on a larger scale than Figure 3, shewing the manner in which packing is inserted between the edge of the bottom plate and the wall of the still casing and the vapour outlet tube.

Figure 3ᵇ is a detail view shewing the manner in which the inner ends of the segmental fittings are supported one upon the other by means of rods or distance pieces.

Figures 3ᶜ and 3ᵈ are detail views shewing alternative means for making a substantially liquid tight joint between the outer edge of the bottom of the respective compartments and the wall of the still.

Figure 4 is a diagrammatic development of a series of compartments constituting the channel along which the liquid passes through the still, indicating the manner in which the difference of level between the bottom plates of succeeding compartments is determined by ledges mounted upon the outer faces of the lateral walls of the segmental fittings, as well as the difference of level of liquid in adjacent compartments.

Figure 5 is a detail view shewing the manner in which outlet valves are provided in vertical line in the lower part of the segmental fittings for the purpose of draining the respective compartments, and the central cavities within the segmental fittings.

Figures 6, 7 and 8 are respectively detail sectional view, detail plan and detail end sectional elevation of the segmental fittings, shewing the manner in which the bottom plates of the compartments are supported thereby, and the manner in which separated vapour compartments are formed in the helical space above the level of the liquid in the series of compartments in the still.

Figures 8ª and 8ᵇ are respectively end views of one of the segmental fittings.

Figures 8ᶜ, 8ᵈ, 8ᵉ, 8ᶠ are corresponding plan, elevation, vertical section, and underplan respectively of one of the segmental fittings.

Figure 9 shows in sectional elevation a still provided with a valve operating float, that may be employed for the purpose of automatically operating the outlet valve for the residue of distillation.

Figure 9$^a$ is a sectional elevation corresponding to Figure 9, but taken through a plane at right angles to that in which Figure 9 is taken.

Figure 9$^b$ is a partial sectional elevation taken in another different plane.

Figure 9$^c$ is a plan view of the still illustrated in Figures 9, 9$^a$ and 9$^b$.

Figure 10 is a detail view and Figure 10$^a$ is a sectional elevation on the line $x$—$y$ Figure 10.

Figure 11 shows in sectional elevation a still such as illustrated in Figures 1 and 2, mounted in a furnace setting. In this figure the details in the construction of the still are not indicated, while the setting is illustrated in such a form that the central chimney may be used for the waste gases from a furnace setting of identical form in an oppositely disposed position, the respective chimney passages being thus disposed in juxta-position with a central division wall between.

Figure 12 is a transverse section corresponding to Figure 11.

In carrying the invention into effect according to one construction as illustrated more particularly in Figures 1 and 2 and adapted for the distillation of crude oil or partially topped oil, a still $a$ is provided of a cylindrical form having a top plate $a^2$ and a bottom plate $a^{31}$, and is mounted with its longitudinal axis vertically disposed within a brickwork setting $b$ as illustrated in Figures 11 and 12.

The oil to be distilled passes through the still casing in a substantially helical course, through distinct transverse zones, the liquid being intercepted in its downward course through a channel in which weirs are provided at intervals to form separate intercepting compartments $c$ disposed within the annular space between the casing of the still $a$ and the concentric cylindrical vapour outlet tube $d$ as illustrated in Figures 1 and 2. Each of the intercepting compartments $c$ is disposed at a slightly lower level than that immediately preceding it, so that the liquid under distillation may thus flow over the weir in passing from one compartment to that next in front of it.

Heat is applied to the casing of the still $a$ in distinct zones, and gradually increases in temperature from the top where the crude oil is admitted through the inlet $a^3$, to the bottom from which the liquid residue is discharged through the outlet pipe $l$ as hereinafter described.

The central vapour outlet tube $d$ is divided into compartments $d^1$ $d^2$ $d^3$ $d^4$ $d^5$ by the insertion therein of diametrical partitions $e$. Holes $e^1$ are provided in the vapour outlet tube $d$ in determined positions, through which the vapours may pass from the helical space above the level of liquid in the series of compartments constituting the channel, to the respective compartments $d^1$ $d^2$ $d^3$ $d^4$ of the vapour outlet tube, whence the respective vapours may leave the still through separate vapour outlet pipes $f^1$ $f^2$ $f^3$ $f^4$. Holes $e^{21}$ leading from the compartment $d^5$ to the helical vapour space in the construction shown in Figure 1, allow vapour to pass from the said compartment into the helical vapour space. Drain pipes $e^4$ (Figure 9) whose lower ends are submerged may serve to return any condensate from the compartments of the vapour outlet tube back to the still.

Each compartment $c$ of the helical channel has a transverse sectional shape indicated more particularly in Figures 1, 3 and 6, the shape being such that the depth of the liquid within each compartment near the wall of the still $a$ is relatively considerable, so that thus the oil to be distilled lies in contact with the wall of the still throughout the length of the helical channel.

The bottom $c^1$ of each compartment has a transverse section illustrated in Figure 3, the bottom rising upwardly from a position adjacent the casing of the still $a$, and extending at a slight upward inclination towards the central vapour outlet tube $d$. The lowest liquid level, indicated by the line 1 in Figure 3, of one compartment, is higher than the lowest part at $c^2$ of the bottom of the compartment next immediately above it. Such a construction, while permitting of the utilization of the whole of the peripheral part of the casing of the still $a$, to which heat is externally applied, as a part of the channel in which the liquid passes through the still, and while also permitting of a body of liquid being maintained against the whole of the internal surface of the said peripheral part of the casing, permits of the formation of a substantially helical space (indicated 2 in Figure 3), above the level of the liquid in the respective compartments of the helical channel, into which the vapour rises, and in which the vapour is out of contact with the outer wall $a$, and from which it may discharge at intervals through the holes $e^1$ into the respective compartments $d^1$ $d^2$ $d^3$ $d^4$ of the vapour outlet tube $d$.

Outlet holes $w$ are provided in the segmental fittings (Figure 7) capable of being closed by valves such as $w^1$ (Figure 5) as hereinafter described.

For the purpose of supporting the bottom $c^1$ of the respective compartments of the channel, and for setting them in definite relation, one slightly below the level of the other, preceding it, in continuous succession in the annular space between the casing of the still and the vapour outlet tube, segmental fittings $h$ are provided in vertical series, in radial positions equidistant apart, there being for example six such vertical series of fittings $h$ disposed in a complete circle as illustrated in Figure 2. The segmental fittings form parts of the helical channel and of the respective compartments constituting the channel, as illustrated in Figures 3, 4, 6, 7, 8, $8^a$, $8^b$, $8^c$, $8^d$, $8^e$, $8^f$.

The fittings $h$ are provided with an integral bottom $h^1$, which as illustrated in Figures 6 and 8, has a form in radial section generally corresponding to the bottom $c^1$ (Figure 8) of the compartment, and with the lateral walls $h^2$ $h^3$ radially disposed with reference to the centre line of the vapour outlet tube $d$, and provided integral with the bottom $h^1$.

The bottom $h^1$ and the wall $h^3$ are partially formed in one fitting and partially in a fitting directly under or over it, in one of the vertical series, so that thus when six segmental fittings are provided for the support between them of the bottom plate $c^1$ of the respective adjacent compartments, as in the construction illustrated in Figure 2, the seventh fitting $h$, illustrated diagrammatically in Figure 4, will be disposed directly under the first, as shown in that figure, and as shown in Figures 3 and 6. Thus the cavity between the respective lateral walls $h^2$ $h^3$ of the segmental fittings is only completed by two segmental fittings being set in line one above the other, as illustrated in Figure 3.

One lateral wall $h^3$ of each segmental fitting has its upper edge for a considerable part of its length extended from a position adjacent the vapour outlet tube $d$ lower than the rest of its length to form a weir at 3, Figures 2, 3, 4, 7, $8^a$, $8^c$ and $8^d$, over which the liquid may flow from one compartment to the next in front at a lower level. Each such weir serves to maintain a level of oil in the compartment preceding it such as will seal the bottom $c^2$ (Figure 3) of the compartment immediately above it and thus maintain a body of liquid against the external wall throughout the still. The weirs are preferably inclined to a slight extent downwardly towards the vapour outlet tube, so that the liquid in passing through the cavity formed by the adjacent lateral walls $h^2$ $h^3$ and bottom $h^1$ of the respective segmental fitting is directed towards the end lying adjacent the vapour outlet tube, where the depth of the cavity is shallowest. The other lateral wall $h^2$ of each segmental fitting, the upper edge of which projects above the liquid in the channel, has an aperture $h^{21}$ (Figures 4, 6, $8^b$ and $8^e$), formed at its lower end at the jointing line 4 (Figure 3), between fitting and fitting in the vertical series, through which the liquid may pass from one compartment $c$ into the central cavity of the segmental fitting, the liquid overflowing from this cavity over the weir 3 of the lateral wall $h^3$. At the lower end of each fitting $h$, the bottom $h^1$ and the lateral wall $h^3$ may be provided with a horizontal jointing face which is indicated by dotted lines in Figure $8^f$, and with an integral outwardly extending flange $h^4$ (Figures 6, 7, $8^d$, $8^e$ and $8^f$); and at the upper end of each fitting, the bottom $h^1$ and the lateral wall $h^3$ may be similarly provided with a horizontal jointing face which is indicated by dotted lines in Figure $8^c$, and with an integral outwardly extending flange $h^5$, and the respective fittings $h$ are secured together in vertical series in line (Figures 3 and 6) by means of bolts passing through aligned holes $h^6$ in the respective flanges $h^4$ $h^5$.

At one end of the respective fittings, an integral end wall $h^7$ (Figures 6, $8^a$, $8^c$, $8^d$, $8^e$ and $8^f$) is provided with a slightly protruding face $h^8$ which extends towards the vapour outlet tube $d$, providing a recess into which packing may be inserted, while the opposite end of the fitting, is open, and the lower part of the bottom $h^1$, provided at the upper end of each fitting, and the end of the wall $h^3$, form together a face $h^{81}$ indicated in Figure $8^b$, extending towards the casing of the still $a$, a liquid tight joint being maintained between the bottom $h^1$ and the wall of the still by suitable means, such as an integral upstanding flange $h^9$ between which and the casing of the still $a$, packing $h^{10}$ may be applied as illustrated in Figure 6. It will be understood that no liquid tight joint is necessary at the vertical edge of the lateral wall $h^2$, but at the edge of the lateral wall $h^3$ a vertical recess $h^{91}$ is formed, and packing such as $h^{10}$ may be interposed between this flange and the still casing, to make a liquid tight joint between the vertical edge of the lateral wall $h^3$ and the casing of the still, so as thus to ensure against any substantial amount of leakage between compartment and compartment.

The respective vertical series of fittings $h$ disposed one upon the other, as described, may be mounted upon vertical rods $z$ (Figure 3), extending the length of the still, the rods being situated conveniently in position near the vapour outlet tube. The rods $z$ are provided of a length corresponding to the distance apart of the inner ends of the segmental fittings, and may be secured together in line in the manner illustrated in Figure $3^b$, thus supporting the fittings one above the other, and maintaining them in alignment.

On the outer face of the lateral wall $h^2$ of each of the segmental fittings $h$, a ledge $h^{11}$ is integrally formed of a shape generally corresponding to the form of the bottom $c^1$ of the compartment $c$, for the reception and support of the radial edge of the bottom $c^1$, while on the outer face of the lateral wall $h^3$ another ledge $h^{12}$ is provided, at a lower level than the ledge $h^{11}$, for the reception and support of the bottom $c^1$ at the other radial edge, and the respective edges of the bottom $c^1$ may be secured to the ledges $h^{11}$ $h^{12}$ by bolts.

The respective ledges $h^{11}$ and $h^{12}$ are thus formed partly on one fitting and partly on the fitting immediately in line beneath, as illustrated in Figures 6, $8^a$, $8^b$, $8^c$, $8^d$, $8^e$ and $8^f$, that is to say, one segmental fitting has provided at its upper end, the lower part of the respective ledges $h^{11}$ $h^{12}$ as well as the lower part of the bottom $h^1$, and the lower parts of the lateral walls $h^2$ $h^3$, so that thus the respective ledges $h^{11}$ $h^{12}$ extend to form part of the jointing faces indicated in dotted lines in Figures $8^c$ and $8^f$. Thus the ledges are made continuous, on one fitting being superposed upon another as indicated in Figure 6.

The respective adjacent fittings $h$ disposed in a circle as described, serve to form respectively between them an intercepting compartment $c$ of the helical channel for the liquid, and one segmental fitting is disposed at a slightly lower level than that preceding it, the difference of level being determined by the difference in level of the respective ledges $h^{11}$ $h^{12}$. Thus on the respective adjacent segmental fittings $h$ being set into their proper and determined position, a segmental plate of metal may be applied to form the bottom $c^1$ of the compartment $c$ intervening between the respective adjacent fittings.

Thus it will be understood that the bottom plate $c^1$, in plan, is provided of a segmental form with radial edges corresponding to the lateral walls $h^2$ $h^3$ of the adjacent fittings $h$, and with outer and inner edges of a circular curvature corresponding to that of the inner face of the casing of the still, and of the outer face of the vapour outlet tube respectively.

The outer and inner circular edges of the plates or bottoms $c^1$ of the respective compartments are not secured to the still casing and vapour outlet tube respectively. It suffices for a piece of angle iron $h^{14}$, as illustrated in detail in Figure $3^a$, formed to a curvature corresponding to the respective inner and outer edges of the plate $c^1$ to be welded or riveted in a position near the respective edges, so that the respective edges of the plates $c^1$ protrude slightly beyond the vertical face of the angle iron $h^{14}$, whereby packing $h^{13}$ of asbestos or other material may be retained in position to form an effective joint at the respective edges.

In Figures $3^c$ and $3^d$, alternative means for ensuring a tight joint between the outer circular edges of the plate or bottom $c^1$ of the compartments is illustrated. In these Figures a bar $c^{11}$ formed to a circular curvature is secured near the outer edge of the plate $c^1$, and the packing $h^{13}$ is applied between the outer face of the bar $c^{11}$ and the wall of the still $a$. The packing $h^{13}$ is pressed in position by means of a separate retaining bar $c^4$, also formed to a circular curvature, and this bar may be diverted upwardly at one end $c^5$, for the purpose of retaining the packing in the recess $h^{91}$ (Figures $3^c$, $8^b$, $8^c$ and $8^d$) between the vertical edges of the walls $h^3$ and the casing of the still. For the purpose of holding the retaining bar $c^4$ in position, the plate $c^1$ is provided at intervals with vertical holes for the reception of bolts $c^6$, screw threaded at their upper ends, for the reception of nuts by which collars $c^7$, having downwardly protruding parts $c^8$ serve to maintain the bar $c^4$ pressing downwards against the packing $h^{13}$. Thus also the diverted end $c^5$ of the bar $c^4$ serves tightly to hold the packing within the vertical recess $h^{91}$.

Thus a substantially helical series of compartments $c$, to constitute a helical channel for the liquid to be distilled, is provided within the annular space between the casing of the still $a$ and the central vapour outlet tube $d$; and the position of the bottom $c^1$ of each compartment is determined by the respective ledges $h^{11}$ $h^{12}$, formed on the lateral walls $h^2$ $h^3$ in the manner described, and as diagrammatically illustrated in Figure 4, so that thus while the construction of the series of compartments is facilitated, the depth of the liquid in the compartments is uniform in any circumferential line and is variable in any radial line.

The lateral wall $h^3$ of each segmental fitting may be provided with relatively very small holes such as $h^{31}$ (Figures 3 and $8^d$) for facilitating movement of the liquid.

In Figure 4 it will be understood that the section is taken on a circumferential line at the deeper end of the compartments. The liquid is intercepted in bulk in the compartment $c$ under such conditions that a circulation of the liquid is maintained within the compartment, and that before flowing from one compartment $c$ to the other in front of it, the liquid is caused to pass through the aperture $h^{21}$ in the lower part of the lateral wall $h^2$ of the adjacent segmental fitting, into the central cavity or compartment in the fitting, and to rise therein to the surface and thence to flow over the weir 3 of the lateral wall $h^3$ into the next compartment (as ilustrated in Figure 2 by arrows), so that thus inasmuch as the channel for the liquid to be distilled is formed in part by the whole of the surface of the still, to which heat is externally applied, the continuous movement or circulation imparted to the liquid within the compartments favours the transfer of heat, and the immediate release from the liquid of the vapours as they are produced, and thus the heat imparted to the still is effectively utilized and a very considerable evaporating surface provided for the liquid in its course through the still.

It will be understood that the weir 3 might be provided in the wall $h^2$, and the aperture $h^{21}$ in the wall $h^3$, so that thus the liquid may pass through the segmental fitting in a reverse direction to that required in the construction hereinbefore described.

It will be understood that the crude oil admitted at the inlet $a^3$ (Figures 1 and 9$^a$) passes directly into the uppermost compartment $c$ and overflows to the next in succession, passing through zones of increasing temperature. The vapours released in the respective parts of the helical space 2, above the level of the liquid in the helical channel, formed by the respective compartments, passes through the holes $e^1$ into the respective compartments $d^1$ to $d^4$, whence they pass to separate condensers, through the respective vapour outlet pipes $f^1$ $f^2$ $f^3$ $f^4$.

The lowermost compartment $c$ of the channel provided as hereinbefore described, being disposed at the bottom of the still casing $a$, the liquid flows over the weir 3 of the terminal fitting $h$, and accumulates in the bottom of the still, where the residue is maintained at a normal level indicated at 5 (Figures 1 and 9) either by means of the upstanding pipe $l^1$ (Figure 1) or in the manner hereinafter described. Holes $d^{81}$ are provided in the wall of the vapour outlet tube $d$, whereby the liquid residue may pass into the downwardly extending part $d^6$ of the vapour outlet tube. These holes $d^{81}$ in the construction illustrated in Figure 1 are provided below the level 5, and vapour outlet holes $e^{21}$ are positioned immediately above; while in the modification illustrated in Figure 9, the holes $d^{31}$ are disposed at and above the level 5, and thus serve also as vapour outlet holes.

The level of oil in the annular space in the still at 5 is advantageously maintained during operation at a level below the level in the last compartment $c^1$ corresponding to the difference of level between succeeding weirs in the helical series throughout the still. In the modification illustrated in Figures 9, 10 and 10$^a$ this level is maintained by a number of ports $d^{81}$ provided in the vapour outlet tube $d$ for the purpose of the overflow of oil from the annular space in the still to the lower part $d^6$ of the vapour outlet tube. The level of oil maintained in the part $d^6$ of the vapour outlet tube is unimportant so long as it lies between the level 5 and the bottom $a^{31}$ of the still (Figure 9). The small holes $d^{82}$ (Figures 9 and 10) provide means for drainage from the annular space into the part $d^6$, and do not interfere with the normal operation.

The helical vapour space may be undivided, but means may be provided as illustrated in Figures 6, 7, 8 and 9$^b$ to separate it into two or more sections. It is in general preferred to divide the space into two, three or four sections. Such means may consist of a partition $i$ mounted upon the outer faces of the walls $h^2$ of any two fittings disposed in line, so as thus to separate the vapour space formed between these respective fittings. Such partitions may for example be provided in the still in positions adjacent the ports $e^1$ (Figure 1). Following the direction of flow of the vapours which is generally upwards, each such partition is disposed immediately beyond the outlet ports $e^1$ with which it corresponds. Thus the vapour on release in the respective sections of the vapour space flows upwards in a direction opposite to the flow of the stream of oil, and the positions of discharge of the vapours into the corresponding compartments of the vapour outlet tube are in the zones of the lowest temperature in the respective sections. Similarly the vapours on their upward and outward course from the respective lower compartments of the vapour outlet tube pass through vapours in the upper compartments which have successively lower temperatures. Thus the conditions under which the vapours pass through the still tend to the elimination by condensation of those bodies having the highest boiling point, and thus effect a measure of correction of the respective fractions. Thus the helical vapour space may be divided into sections, and means may be provided to permit of communication between the respective sections. Such means may consist, as illustrated in Figures 6, 7 and 8, in providing an aperture in the partition $i$ closed by a door $i^1$ carried upon a hinged rod $i^2$, mounted in brackets $i^3$ upon the partition, and the hinged rod $i^2$ may be caused to protrude through the wall of the vapour outlet tube $d$, and an arm $i^4$ may be mounted on its outwardly protruding end. The end of the arm $i^4$ is slotted for the reception of the end of a rod $i^5$, on the end of which a weight $i^6$ is carried. A collar $i^7$ is secured in determined positions on the rod $i^5$ in order positively to close the door $i^1$ when required. Suitable means may for example be provided, such as illustrated in Figure 6, on the top plate $a^1$ of the vapour outlet tube, by which the rod $i^5$ may be raised for opening the respective doors $i^1$ or for lowering or closing them.

It will be understood that as a measure of practical convenience the partitions $i$ may be mounted in vertical line, and that the hinging rods $i^2$ may thus also be mounted in line, and thus the arms $i^4$ may be disposed so as to be actuated by the same rod $i^5$; but separate rods $i^5$ are preferred as illustrated in Figure 9$^b$. The partitions $i$ are advantageously so disposed that the hinging rods $i^2$, arms $i^4$ and the rods $i^5$ may be disposed clear of the vapour outlet tubes $f^1$ $f^2$ $f^3$ $f^4$ as illustrated in Figures 2 and 9$^c$. Or again each door $i^1$ may be operable by separate means such as described and as illustrated in Figure 9$^b$. It will, however, be understood that the doors $i^1$ may be otherwise arranged than as described, and may be operated for opening or closure by any other means than indicated, for permitting communication between the respective sections of the helical vapour space.

Each of the diametrical partitions $e$ in the vapour outlet tube $d$ are advantageously provided with a central aperture closed by a cover plate $e^2$, by means of which access is possible to the respective compartments $d^1$ to $d^5$, when the still is out of use. These cover plates may serve for the passage through them of steam pipes $j$, through which superheated steam may be passed in a number of positions in the length of the still, into the helical vapour space, and for this purpose holes or apertures $e^3$ (Figure 2) may be provided, through which the steam pipes $j$ may pass in line, and suitable packing may be applied to maintain a tight joint. One or more steam pipes $j$ may be provided for each section of each vapour space, and the upper ends of the steam pipes may respectively be diverted laterally to pass through the wall of the vapour outlet tube $d$ in suitable glands, and their inwardly protruding ends $j^1$ may be perforated. The steam pipes $j$ may extend downwardly in line, and pass through a hole provided in the bottom plate $d^7$ of the vapour outlet tube, through a cover plate provided for the purpose in a position clear of the residue outlet pipe $l$. The external parts of the steam supply pipes $j^2$ (Figure 1) may be provided with separate cocks, for independent regulation of the superheated steam. By such means it will be understood that the steam or other fluid medium is admitted in a regulable degree into the respective parts of the helical vapour space, so that thus evaporation may take place throughout the still in an atmosphere of steam.

When the doors $i^1$ are closed, and when thus the separated sections of the helical vapour space are sealed, it is necessary that the variation in pressure as between section and section should not exceed predetermined limits. For the purpose of indicating the pressures, suitable pressure gauges may be provided on the off-take pipes $f^1$ $f^2$ $f^3$ $f^4$. For the purpose of adjusting and regulating the pressures in the several compartments butterfly valves or the like, operating as throttle valves may be provided in the vapour off-take pipes $f^1$ $f^2$ $f^3$ $f^4$. Or instead the doors may be opened for the purpose of ensuring the restoration of a uniform pressure in the helical vapour space.

Vacuum and pressure valves may be mounted conveniently on the vapour off-take pipes.

Within the lower downwardly protruding part $d^6$ of the vapour outlet tube $d$, means may be provided for the admission of superheated steam. For this purpose, a perforated tubular ring $k$ (Figure 1) may be concentrically arranged within the downwardly protruding part $d^6$ of the vapour outlet tube. Superheated steam may be caused to pass through a supply pipe $k^3$ passing through the lower end plate $d^7$ of the vapour outlet tube $d$, and the tubular ring $k$ may be provided with holes directed inwardly in such position, that the admission of steam through them favours the circulation of the liquid residue, and so avoids local overheating.

An outlet pipe $l$ may be mounted to pass through the end plate $d^7$ of the vapour outlet tube, through which the liquid residue may be discharged. This outlet pipe may be connected as in the modification illustrated in Figure 1 to an external upstanding branch $l^1$ having a determined height, by means of which the level of the liquid residue in the lower part of the casing of the still $a$, and in the lower part $d^6$ of the vapour outlet tube $d$ may be maintained substantialy constant. Alternatively an automatically operating valve may instead be provided, operated by a float, and this is in general preferred.

An arrangement suitable for automatic operation is indicated in Figures 9, 10 and 10$^a$ of the accompanying drawings, in which on the end plate $d^7$ of the vapour outlet tube $d$, an outlet fitting $m$ may be provided, through which the residue may under particular circumstances be withdrawn independently of the automatically operated outlet valve $m^5$, and a centrally disposed outlet pipe $m^1$ of smaller diameter may be concentrically mounted within the outlet fitting $m$. The upper end of this outlet pipe $m^1$ may be provided with a cover plate $m^2$, while immediately beneath, a series of outlet holes $m^3$ may be formed in position between the respective seats $m^4$ of a double valve $m^5$, having downwardly depending circular flanges of a knife-edge section, making a line contact with the respective valve seats $m^4$, on the valve being lowered on its seats. The valve $m^5$ is connected to the lower end of a valve rod $m^6$, which passes through a central hole in the cover plate $m^2$. To the upper end of this rod a cylindrical float $m^7$ is mounted, while the upper end of the valve rod $m^6$ is supported by such means as a perforated plate or spider fitting. It will be understood that on the level 5 of the liquid residue rising, the float $m^7$ will be raised, and the outlet valve $m^5$ will thus be lifted to permit of the liquid residue flowing out through the holes $m^8$, into the outlet pipe $m^1$. Thus on the float $m^7$ falling, the discharge of the liquid residue is thereupon cut off, as a consequence of the closing of the valve $m^5$ upon its seats. It will be understood that any other outlet valve may be provided to be automatically operable in the manner described.

As illustrated in Figures 9, $9^a$ and $9^c$ a manhole fitting and cover plate $d^{10}$ may be applied on the top plate $a^1$ of the vapour outlet tube, and a similar fitting and cover plate $a^{10}$ may also be applied on the top plate $a^2$ of the still.

Figures 11 and 12 shew by way of example a brickwork setting suitable for the still, but it will be understood that the setting forms no part of the present invention. As illustrated in these figures, the brickwork setting $b$ is provided wih a series of annular flues $n$ completely to surround the still casing $a$, as well as an annular flue $n^1$ to surround the downwardly protruding part $d^6$ of the vapour outlet tube $d$. The adjacent annular flues $n$ are separated from each other and from the annular flue $n^1$ by horizontal annular walls $n^2$, which come to lie in contact with the casing of the still, being supported at their inner edges by means of angle iron rings $n^{21}$. At one side of the setting a series of liquid fuel or gas burners, such as $n^3$, may be mounted within combustion chambers $n^4$ respectively communicating with the separate annular flues $n$ and $n^1$. Holes $n^{31}$ may be provided for the admission of secondary air into the combustion chambers $n^4$, and the lower holes $n^{31}$ may be provided with means for regulating the amount of secondary air admitted. There may for example be six separate annular flues $n$ disposed in series to surround the casing of the still $a$, and a vertical series of a corresponding number of combustion chambers $n^4$ may be provided. Each combustion chamber $n^4$ is disposed radially with reference to the annular heating flue $n$ or $n^1$, and the heating gases enter the annular heating flue $n$ impinging against the centrally disposed vertical wall $n^{41}$ which is provided of a substantially angular section, having curved faces of a form such as illustrated in Figure 12, by which the heating gases may be separated into two distinct streams to flow in reverse directions around the respective parts of the annular flue. A number of radially disposed baffle walls or blocks $n^5$ may be provided, as illustrated in Figure 12 with a view to effect interruption and movement of the streams of heating gases. The hot gases thus pass in opposite directions around the still, and thence outwardly from the annular flue $n$ into the uptake $n^6$, through elongated apertures $n^7$, provided in a position in the setting opposite to that at which the combustion chambers $n^4$ are provided. The elongated outlet apertures $n^7$ may be provided with a damper capable of operation from without for the purpose of regulation.

Man-holes $n^{11}$ (Figure 12) are provided for access to the annular flues, and these may be temporarily closed by bricks or blocks.

A layer of firebrick $n^{12}$ may be applied in position opposite to the combustion chambers $n^4$ for the protection of the still casing against local overheating.

The still may be supported in a foundation $n^{13}$ filled with concrete, and the bottom plate $a^3$ of the still, and the bottom plate $d^7$ of the vapour outlet tube are supported in the setting, but in such manner as to leave a passage $n^{14}$ beneath the vapour outlet tube to permit of access to the outlet pipes and steam pipes; while a transversely disposed passage may be provided beneath the setting and at right angles to and on a level with the passage $n^{14}$ for convenience in disposing the steam pipes and residue outlet pipes respectively.

By means of a steel framework, platforms may advantageuosly be provided at the various levels on the setting, and ladders or steps, by means of which the respective burners and the respective annular flues may be accessible and from which the inlet for the crude oil, the draining valves and the valves upon the vapour outlet pipes are accessible.

The vapours from the still may be passed directly to air or water cooled condensers; or they may first and in part or wholly be passed through pre-heaters. The hot residue from the still is discharged hot and passed to storage or for further treatment, or for cooling by air or water, or the hot residue may be used wholly or in part for pre-heating the crude oil before admission to the still.

For the purpose of draining the respective compartments of the still any suitable means may be provided. The means indicated in Figures 5 and 9 of the drawings comprise holes $w$ provided in the lower part of the bottom $h^1$ of the respective fittings. Thus the respective vertical series of the fittings $h$ have their drainage holes $w$ in alignment, and valves $w^1$ are provided connected together by means of a chain $w^2$ (Figure 5) or a rod of such a length that each valve $w^1$ is free to take its proper seating in the draining hole $w$, the length of chain $w^2$ or rod between successive valves $w^1$ being sufficient for this purpose. The valves $w^1$ are provided of any suitable form as also are the valve seats. Each valve $w$ is advantageously formed with a depending conical part $w^3$ (Figure 5), with a hook fitting $w^4$ and a depending rod $w^5$, so that thus the rod $w^5$ of one valve is connected to the hook fitting $w^4$ of the next valve beneath it, by means of the length of chain $w^2$. In Figure 5 chains $w^2$ are shewn to connect the valves, while in Figure 9 the chain $w^2$ is replaced by the downwardly depending rod $w^5$ which extends to engage the hook fitting of the valve next beneath. The formation of each valve with a depending conical part suffices to ensure that all valves of each compartment be lifted clear of their seats, for the purpose of draining, and of the valves returning to their seats under their own weight, but if desired means may be provided for the return of the valves to their seats.

Any suitable means than hereinbefore described may be provided for lifting the draining valves or for draining the respective compartments. For example a rod $w^6$ carrying the connected lengths of chain $w^2$ or rods may extend to the top plate of the still, and the protruding end of the rod $w^6$ may be provided with screw threads by means of which on the rotation of a nut or hand wheel $w^7$, the rod $w^6$ carrying the connecting chain $w^2$ or rods may be lifted or lowered and thus all the valves $w^1$ of the vertical series of segmental fittings may be lifted for draining the adjacent compartments.

The compartments of the central outlet tube may be packed with vitrified clay packing or other suitable medium for the purpose of correction of the vapours evolved.

In the use of a still as hereinbefore described, it will be understood that the whole of the surface of the still casing to which heat is applied is utilized for the direct transmission of heat to the oil to be distilled, that the oil in its progress through the helical channel in the still is circulated, that a very considerable evaporating surface is provided for the release of the vapours, and that the circulation imparted to the oil within the respective compartments and the movement necessary to the oil on flowing from one compartment to the other, facilitates the disengagement of the vapours. By such means good fractionation results and the overheating of the oil or of the vapour is avoided, and distillation products are directly and continuously produced as may be determined according to the temperature conditions employed. Furthermore the degree of heat applied in the respective heating zones may be varied according to the fractions desired.

The still constructed according to the invention is primarily intended for use, in combination with other apparatus, in the continuous fractional distillation of the lighter hydrocarbons—benzine and kerosene—from petroleum oils relatively rich in such lighter fractions. Stopping short of the point where residuum from any oil in process sets hard upon cooling, distillation so far as concerns the still may however be carried beyond the kerosene fraction.

It may be used without regenerative apparatus (pre-heaters) in which case vapour generated would pass forward for condensation (after correction in dephlegmators if desired) and the residuum be re-run in other apparatus for further reduction or discharged forward for cooling and storage.

Preferably, especially in connection with the kind of oil it is primiarly designed to treat, the still is to be used in conjunction with regenerative apparatus, the heat in the vapour generated in the still, the heat in steam (where steam is used) and in the residuum from the still being utilized in suitably contrived apparatus to distil off from the oil the lightest fractions. In this preferred arrangement partly topped oil is thus treated in the still.

Varying with size and general proportions adopted in any given case the still will function and the regulated flow take place between wide limits as may be required to meet varying practical conditions such as the character of the oil to be distilled, and the fractions to be recovered. Furthermore although primarily intended for distillation carried out at pressures slightly above atmospheric, the still may be operated under partial vacuum or at pressures in excess of atmospheric pressure.

I claim:—

1. In the distillation of crude oil and other similar liquids, a method of evaporation consisting in causing the liquid to flow in a descending course, intercepting the liquid to form pools at successively lower levels, the liquid flowing successively from pool to pool, applying heat laterally to the liquid in its course, liberating the vapours from the liquid in the pools at the side away from that at which heat is applied and shielding the vapours from the direct application of heat, substantially as described.

2. In the distillation of crude oil and other similar liquids, a method of evaporation consisting in causing the liquid to flow in a descending helical course, intercepting the liquid to form pools at successively lower levels, the liquid flowing successively from pool to pool, applying heat laterally to the liquid in its helical course, liberating the vapours from the liquid in the pools and shielding the vapours from the direct application of heat, substantially as described.

3. In the distillation of crude oil and other similar liquids, a method of evaporation consisting in causing the liquid to flow in a descending course, intercepting the liquid to form pools at successively lower levels, the liquid flowing successively from pool to pool, liberating the vapors from the liquid in the pools, applying heat to the liquid in the pools in zones, the temperature of which progressively increases in the direction of flow of the liquid, the heat being applied to the liquid from the side away from that at which the vapour is liberated, and separately collecting the vapours from the said respective zones, substantially as described.

4. In the distillation of crude oil and other similar liquids, a method of evaporation consisting in causing the liquid to flow in a descending course, intercepting the liquid to form pools at successively lower levels, the liquid flowing successively from pool to pool, applying heat laterally to the liquid in its course, liberating the vapours from the liquid in the pools at the side away from that at which heat is applied, shielding the vapours from the direct application of heat and causing the circulation of the liquid in the pools, substantially as described.

5. In the distillation of crude oil and other similar liquids, a method of evaporation consisting in causing the liquid to flow in a descending course, intercepting the liquid to form pools at successively lower levels, the liquid flowing successively from pool to pool, applying heat laterally to the liquid in its course, liberating the vapours from the liquid in the pools at the side away from that at which heat is applied, shielding the vapours from the direct application of heat and causing the vapours to flow above the liquid and in a direction opposite thereto, substantially as described.

6. Stills adapted for the distillation of crude oil and other similar liquids, comprising an outer wall, and a liquid conducting channel of a substantially helical form disposed within the still beside the said outer wall, weirs within the said channel dividing it into a descending series of compartments adapted to maintain a body of liquid in contact with the whole area of the said outer wall, substantially as described.

7. A still adapted for the distillation of crude oil and other similar liquids, comprising an outer wall, a liquid conducting channel extending beside the said outer wall within the still, weirs within the said channel dividing it into a descending series of compartments adapted to maintain the levels of the liquid progressively lower, the cross-sectional shape of the said channel being deep near the said outer wall and shallow in direction away from the said outer wall where a space is formed beneath the channel, substantially as described.

8. A still adapted for the distillation of crude oil and other similar liquids, comprising an outer wall, a liquid conducting channel extending beside the said outer wall within the still, weirs within the said channel dividing it into a descending series of compartments adapted to maintain the levels of the liquid progressively lower, the cross-sectional shape of the said channel being deep near the said outer wall and shallow in direction away from the said outer wall, where a space is formed beneath the channel for the reception of vapour, and a vapour outlet tube within the still in communication with the said vapour space, substantially as described.

9. A still comprising a substantially cylindrical casing, a substantially cylindrical vapour outlet tube concentrically disposed within the said casing, a channel of substantially helical form within the annular space between the said casing and the said tube, the said channel being formed as a descending series of compartments of a radial cross section which is deep near the said cylinder casing and shallow near the said vapour outlet tube, the under side of the channel near the vapour outlet tube forming with the latter a substantially helical vapour space above the parts of the channel beneath, substantially as described.

10. A still adapted for the distillation of crude oil and other similar liquids, comprising an outer wall and a liquid conducting channel extending beside the said outer wall within the still, said channel being constructed of vertical series of weir fittings, the weir fittings in adjacent vertical series and in the same plane supporting between them intermediate plates whereby compartments are formed, each of said weir fittings having a weir to permit of overflow of liquid from one compartment to the succeeding compartment of the channel and to maintain a body of liquid against the adjacent outer wall of the still, substantially as described.

11. A still adapted for the distillation of crude oil and other similar liquids, comprising an outer wall and a liquid conducting channel extending beside the said outer wall within the still, said channel being constructed of vertical series of weir fittings, the weir fittings in adjacent vertical series and in the same plane supporting between them intermediate plates, whereby compartments are formed, the said weir fittings being each formed with two walls enclosing between them an open cavity which is completed only on the respective weir fittings being mounted one upon the other in the vertical series, the bottom of each open cavity in a vertical series being located at the upper part of a weir fitting next below in the vertical series, and one of the said walls forming a weir to permit of overflow of liquid from one compartment to the succeeding compartment, and to maintain a body of liquid against the adjacent outer wall of the still, substantially as described.

12. A still adapted for the distillation of crude oil and other similar liquids, comprising an outer wall and a liquid conducting channel extending beside the said outer wall within the still, said channel being constructed of vertical series of weir fittings, the weir fittings in adjacent vertical series and in the same plane supporting between them intermediate plates whereby compartments are formed, each of the said weir fittings having a weir to permit of overflow of liquid from one compartment to the succeeding compartment of the channel and to maintain a body of liquid against the adjacent outer wall of the still, the said weir fittings being formed with walls having ledges thereon at different levels for the support of the plates set between the adjacent weir fittings, substantially as described.

13. A still adapted for the distillation of crude oil and other similar liquids, comprising an outer wall and a liquid conducting channel extending beside the said outer wall within the still, said channel being constructed of vertical series of weir fittings, the weir fittings in adjacent vertical series and in the same plane supporting between them intermediate plates, whereby compartments are formed, the said weir fittings being each formed with two walls enclosing between them an open cavity which is completed only on the respective weir fittings being mounted one upon the other in the vertical series, the bottom of each open cavity in a vertical series being located at the upper part of a weir fitting next below in the vertical series, the said walls of the weir fittings having ledges on their outer faces at different levels for the support of the plates set between adjacent weir fittings, one of said walls forming a weir to permit of overflow of liquid from compartment to compartment, and to maintain a body of liquid against the adjacent outer wall of the still, substantially as described.

14. A still adapted for the distillation of crude oil and other similar liquids, comprising an outer wall and a liquid conducting channel extending beside the said outer wall within the still, said channel being constructed of vertical series of weir fittings, the weir fittings in adjacent vertical series and in the same plane supporting between them intermediate plates whereby compartments are formed, each of the said weir fittings having two walls enclosing between them an open cavity, one of which walls is provided as a weir and in the other of which is provided an aperture to admit liquid into the open cavity between the said walls, substantially as described.

15. A still adapted for the distillation of crude oil and other similar liquids, comprising an outer wall and a liquid conducting channel extending beside the said outer wall within the still, said channel being constructed of vertical series of weir fittings, the weir fittings in adjacent vertical series and in the same plane supporting between them intermediate plates whereby compartments are formed, each of the said weir fittings being formed of two integral walls enclosing between them an open cavity and an outer part adapted to be closed by the outer wall of the still, one of the said walls being formed as a weir, and the other having an aperture therein to admit liquid into the open cavity between the said walls, substantially as described.

16. A still adapted for the distillation of crude oil and other similar liquids, comprising an outer wall and a liquid conducting channel extending beside the said outer wall within the still, said channel being constructed of vertical series of weir fittings, the weir fittings in adjacent vertical series and in the same plane supporting between them intermediate plates whereby compartments are formed, each of the said weir fittings having a weir to permit of overflow of liquid from one compartment to the succeeding compartment of the channel and to maintain a body of liquid against the adjacent outer wall of the still, the said weir fittings being formed of two integral walls enclosing between them an open cavity and an outer part adapted to be closed by the outer wall of the still, and means for making a joint between the outer end of the weir fittings and the wall of the still, substantially as described.

17. A still adapted for the distillation of crude oil and other similar liquids comprising an outer wall, a liquid conducting channel of a substantially helical form and disposed within the still beside the said outer wall the cross-sectional shape of the said channel being deep near the said outer wall and shallow in direction away from the said outer wall where a vapour space is formed beneath the channel, weirs within the said channel dividing it into a descending series of compartments, and a vapour outlet tube divided into compartments, the said compartments being respectively in communication with different parts of the vapour space, substantially as described.

18. A still adapted for the distillation of crude oil and other similar liquids comprising an outer wall, a liquid conducting channel of a substantially helical form and disposed within the still beside the said outer wall the cross-sectional shape of the said channel being deep near the said outer wall, and shallow in direction away from the said outer wall where a vapour space is formed beneath the channel, weirs within the said channel dividing it into a descending series of compartments, a vapour outlet tube divided into compartments, said compartments respectively communicating with different parts of the said vapour space and vapour outlet pipes leading from the respective compartments of the vapour outlet tube and extending upwardly through the vapour outlet tube, substantially as described.

19. A still adapted for the distillation of crude oil and other similar liquids, comprising an outer wall, and a liquid conducting channel of a substantially helical form and disposed within the still beside the outer wall thereof, weirs within said channel to divide it into a descending series of compartments, the cross-sectional shape of the said channel being deep near the said outer wall and shallow in direction away from the said outer wall where a vapour space is formed beneath the channel, partitions in the said vapour space to divide it into separate parts, and an outlet tube communicating with the said respective parts of the vapour space, substantially as described.

20. A still adapted for the distillation of crude oil and other similar liquids, comprising an outer wall, and a liquid conducting channel of a substantially helical form and disposed within the still beside the said outer wall thereof, weirs within the said channel dividing it into a descending series of compartments, the cross-sectional shape of the said channel being deep near the said outer wall and shallow in direction away from the said outer wall where a vapour space is formed beneath the channel, partitions in the said vapour space to divide it into separate parts, an outlet tube communicating with the said respective parts of the vapour space, and valves to open or close communication between the said respective parts of the said vapor space, substantially as described.

21. A still adapted for the distillation of crude oil and other similar liquids, comprising an outer wall and a liquid conducting channel disposed within the still and beside the said outer wall and being constituted of vertical series of weir fittings and plates intermediate said series of weir fittings, and valves within certain of the weir fittings in alignment, the said valves being capable of simultaneous operation for draining the liquid conducting channel, substantially as described.

22. A still adapted for the distillation of crude oil and other similar liquids, comprising an outer cylindrical wall, a liquid conducting channel of a substantially helical form and disposed within the still beside the said outer wall, said channel being formed of a plurality of vertical series of segmental weir fittings, and intermediate series of segmental plates carried between the said segmental weir fittings, and a centrally disposed vapour outlet tube, substantially as described.

- PERCY MATHER.